March 3, 1936. J. G. THIBIERGE 2,032,673
MACHINE FOR MANUFACTURING REENFORCING ELEMENTS FOR CONCRETE STRUCTURES
Filed Sept. 27, 1934   2 Sheets-Sheet 1
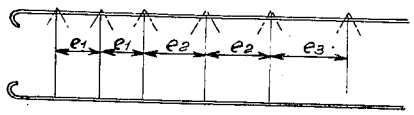
Fig.1
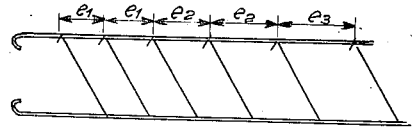
Fig.2
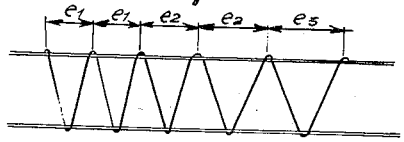
Fig.3
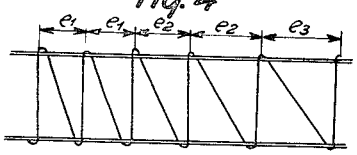
Fig.4
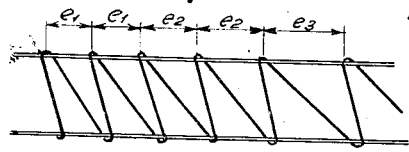
Fig.5
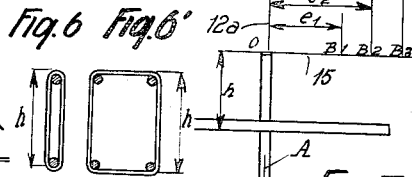
Fig.6  Fig.6'
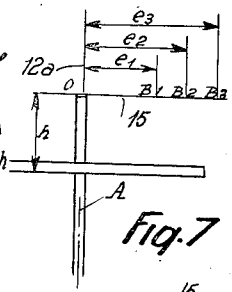
Fig.7
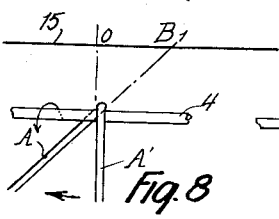
Fig.8   Fig.9   Fig.10
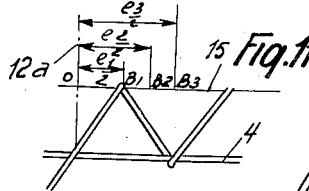
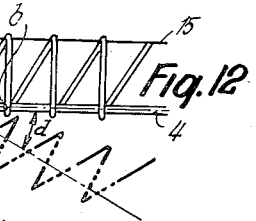
Fig.11   Fig.12
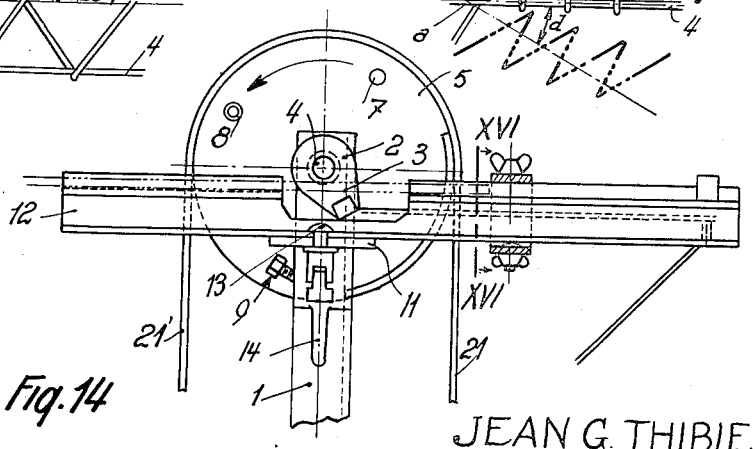
Fig.14
JEAN G. THIBIERGE
INVENTOR
BY Haseltine, Lake & Co.
ATTORNEYS March 3, 1936.  J. G. THIBIERGE  2,032,673
MACHINE FOR MANUFACTURING REENFORCING ELEMENTS FOR CONCRETE STRUCTURES
Filed Sept. 27, 1934  2 Sheets-Sheet 2
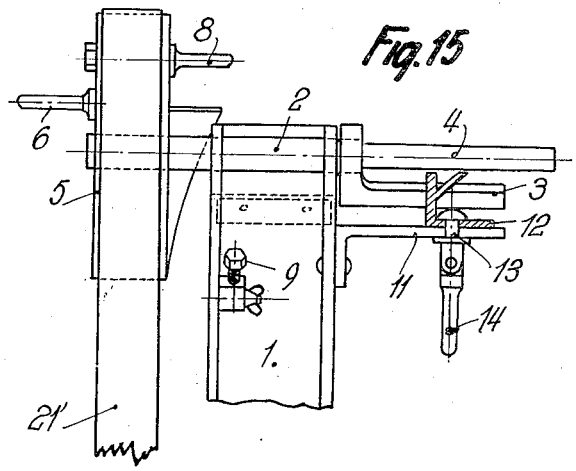
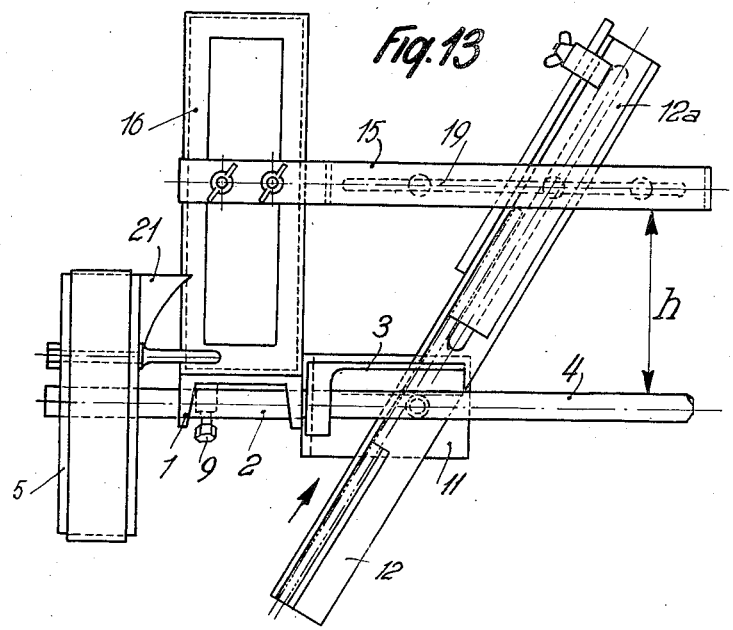
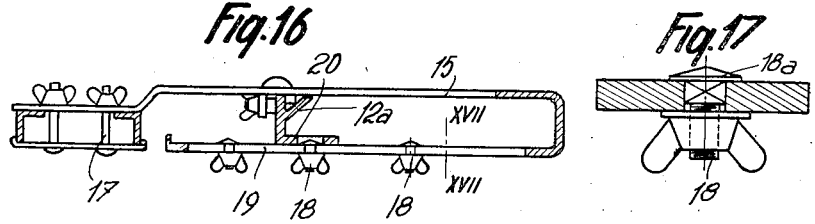
JEAN G. THIBIERGE
INVENTOR
BY Haseltine, Lake & Co.
ATTORNEYS Patented Mar. 3, 1936

2,032,673

UNITED STATES PATENT OFFICE 2,032,673

MACHINE FOR MANUFACTURING REENFORCING ELEMENTS FOR CONCRETE STRUCTURES

Jean Georges Thibierge, Douai, France

Application September 27, 1934, Serial No. 745,771
In France September 27, 1933

6 Claims. (Cl. 140—71)

In the manufacture of beams or pillars of reenforced concrete, use is made of stirrups having two branches parallel to each other and located in the same plane, or of loops of a general rectangular shape, also having all their parts in a common plane. These stirrups or these loops must be subsequently secured to the main bars at suitable intervals, and their manufacture, on the other hand, necessitates considerable manual labour, for cutting at the required length and bending.

Systems of assembling the main reenforcing bars have already been proposed which consist of continuous bars bent in such manner as to include on the one hand elements at right angles to the main bars and, on the other hand, oblique elements connecting together these perpendicular parts. However this method has never been used for practical purposes due to the difficulty of performing the necessary bending operations.

The object of the present invention is to provide a machine for making, on the spot and in a very simple manner, continuous assembling elements of a helical shape of the suitable pitch. This machine thus avoids the necessity of cutting steel elements and makes it possible to fit the assembling elements on the main reenforcing bars without any other measurement, and, on the other hand, the spires thus obtained are rigid enough for making it sufficient to secure the assembling elements to the main reenforcing bars only at intervals of three or four spires.

According to the present invention, it is possible to prepare spires having all of their parts disposed obliquely to the main reenforcing bars, that is to say forming a succession of V elements. It is also possible to prepare spires having parts that are alternately at right angles to the main reenforcing bars and oblique with respect thereto, that is to say forming a succession of N-shaped elements, the parts that are at right angles to the main reenforcing bars being placed under the same conditions as the usual stirrups or loops, while the oblique parts are placed under much better conditions concerning shearing stresses. Finally it is also possible to produce spires in the shape of a succession of inclined N-shaped elements, that is to say all the branches of which are inclined in the same direction.

The machine according to the present invention essentially includes a knife revolving about a horizontal axis and acting on a bar fed below this axis of revolution and obliquely with respect thereto, this knife being automatically brought back to its initial position after each bending operation. The inclination of the guide carrying said bar with respect to said axis can be modified at will so as to correspondingly vary the inclination of the spires and marks may be provided in advance on said guide so as to permit of readily determining the length of the spires.

However, I preferably provide, in parallel relation with the axis of the shaft that controls the bending operations, an arm the distance of which from said axis is adjustable and which is provided along its length with a series of stops, themselves adjustable in position. This arm makes it possible to materialize in an accurate manner, and therefore to determine without any risk of error, the height of the reenforcement, that is to say the distance between the main reenforcing bars and also the pitch of the helix that is to say the interval between two successive bends. This pitch can thus be made variable according to any desired law, under the same conditions as the law of variation of the intervals between the usual stirrups or loops, for instance as a function of the variations of the shearing stress along the beam.

A preferred embodiment of the present invention will be hereinafter described with reference to the accompanying drawings, given merely by way of example, and in which:

Figs. 1 and 2 show two usual arrangements of stirrups or loops placed at variable intervals;

Figs. 3 to 5 inclusive illustrate the application of this arrangement to the system of spires according to the invention;

Figs. 6 and 6' to 12 inclusive diagrammatically show the principle of the present invention;

Figs. 13 to 17 inclusive disclose an embodiment of the invention;

Fig. 13 is a plan view of the machine according to the invention;

Fig. 14 is an end view on the right hand side;

Fig. 15 is a lateral elevational view;

Fig. 16 is a sectional view on the line XVI—XVI of Fig. 14;

Fig. 17 is a sectional view on an enlarged scale on the line XVII—XVII of Fig. 16.

As shown in Figs. 1 and 2, reenforcements for reenforced concrete structures often include stirrups or loops either at right angles (Fig. 1) or oblique (Fig. 2) to the main reenforcing bars, the intervals $e^1$, $e^2$, etc. between two consecutive stirrups or loops varying along a given beam, for instance as a function of the shearing stress.

The object of the present invention is to permit of obtaining, in a quick and simple manner, spires either in the shape of a V (Fig. 3) or in the shape of an N (Fig. 4) or an inclined N (Fig. 5) of flat section, that is to say stirrup-shaped (Fig. 6) or of polygonal section (that is to say loop-shaped, Fig. 6'). The pitch of these spires may be, if desired, variable according to any law whatever, for instance in such manner that the distances between two consecutive spires may be respectively equal to $e^1$, $e^2$, $e^3$, ... as in the usual stirrups or loops (Figs. 1 and 2).

The machine that is shown in the drawings essentially comprises, in a frame 1, a horizontal shaft 2 carrying a bending knife 3 rigidly mounted in an eccentric position with respect to the axis of said shaft, in the manner of a bayonet. On the same side as the knife, shaft 2 is axially prolonged by a rod 4.

On the rear end of shaft 2 is fixed a pulley 5 about which can be wound a cable intended to be fixed to a pedal for operating the machine by means of the foot, or a handle 6 permitting eventually to operate it manually. On the other hand in this pulley are provided holes 7 in which can be engaged a pin 8 which, by striking an adjustable stop 9 fixed to frame 1, serves to limit the angle through which shaft 2 is caused to rotate to the desired value.

On the other hand, on a horizontal bracket 11 fixed to frame 1 rests a guide 12 adapted to pivot about an axis 13 and which can be fixed in position by means of any suitable fixation device such as 14.

This guide consists of an L iron 12 the vertical side of which is cut off immediately under bar 4 and which is provided, on either side of the knife, with inclined surfaces 12a on which the bar to be bent rests. It will be readily understood that, owing to these guiding elements 12a, in the initial position this bar passes between knife 3 and rod 4 and on the contrary the knife can move freely above member 12. On the rear part of guide 12a are provided marks with stops determining the amount by which the bar is to be fed between two successive bending operations, that is to say determining the length of the spires.

However, preferably, the machine is combined with a graduated arm 15 adapted to slide along a frame 16 and which can be fixed in any desired position (at a given distance from axis 4) by means of fixation nuts 17 for instance. This arm 15 is given, in cross-section, the shape of a U, one of the branches passing above guide 12a while the other one forms a support for guide 12. Bolts 18 fitted with wing nuts and adapted to slide in a groove 19 of this branch serve to fix the inclination of this guide with respect to the shaft of the machine; the head 18a of these bolts 18 is made of a suitable shape for permitting the groove 20 provided in the lower part of guide 12 to engage with them and to be easily disengaged therefrom.

The return to the initial position of the machine after each bending operation which, as it will be explained, consists of a rotation of shaft 2 accompanied by a translation along its axis, can be ensured by a coil spring wound about shaft and working in torsion. Preferably, however, the translation of the shaft is controlled by a cam 21a integral with shaft 2 and engaging a part of the frame, while rotation is ensured independently by a weight or a spring acting on the portion 21 of the cable wound about pulley 5, the operating pedal acting on the end 21' of this cable.

In order to render the working of the machine easier to understand, I will first explain the mechanical work that it permits to perform and then the adjustment and the control of an operation.

The iron to be bent being placed in guide 12a as above explained is pushed in the direction of the arrow along the rear guide, passing between rod 4 and knife 3, until it is in the suitable position shown in the drawings, as it will be hereinafter explained.

If shaft 2 is given a suitable rotary movement, iron A, held by knife 3, is caused to wind about rod 4, forming a part A' which makes with part A an angle which depends on the amplitude of the revolution of the shaft and the inclination of the guide; these values of the rotation and the inclination must, in point of fact, be greater than the angles to be finally obtained, so as to make allowance for the elastic deformation of the bar, which will be neglected in the following explanations.

In the example of Fig. 6, the knife must be caused to turn through an angle of 180°, so that the two parts A and A' will be positioned in parallel planes. If, on the contrary, it is desired to obtain a winding forming a reenforcement of rectangular cross section analogous to those obtained with the usual loops (Fig. 6') the knife will be caused to turn through an angle of only 90°. In the course of its rotation, the knife accompanies the part of the iron with which it is engaged in its longitudinal feed movement resulting from the winding. As soon as this winding operation is finished and when the pedal is released, the knife comes back to its initial position under the combined actions of the counter-weight and cam 21a.

The adjustment of the machine according to what kind of reenforcement is to be obtained is diagrammatically shown in Figs. 7 to 12.

It will first be supposed that it is desired to obtain N-shaped spires, as diagrammatically illustrated by Fig. 4.

Arm 15 is then placed at the proper distance $h$ corresponding to the height of the spire (Fig. 5) that it is desired to obtain. The point O at which guide 12a comes into contact with this arm when it is positioned at right angles to shaft 4 is marked.

Bolts 18 are then fixed on arm 15 at points $B_1$, $B_2$, $B_3$ located, with respect to O, at distances $e_1$, $e_2$, $e_3$ corresponding to the respective pitches of the different spires to be obtained.

The guide being stopped at O, the bar is pushed in the guide (Fig. 7) until its end lies in the vertical plane of the front face of arm 15, as shown by Fig. 13. The bending knife is then caused to turn through an angle of 180°, while guide 12a is simultaneously caused to pivot so as to bring it upon mark $B_1$ (Fig. 8).

After this bending operation, the knife is brought back to its initial position. The guide being still on $B_1$, the bar is pushed (Fig. 9) until it comes into contact with arm 15.

The knife is then again caused to turn through an angle of 180° at the same time as the guide is brought back into the position in which it passes through point O (Fig. 10). After the knife has been brought back to its initial position, the iron is pushed until it butts against point O. The shaft is again caused to turn through an angle of 180° at the same time as the guide is brought back upon mark $B_1$ (Fig. 8). The operation is then repeated indefinitely, so as to obtain alternately parts at right angles to rod 4 and parts disposed obliquely to this axis. It will be noted that it would be possible to obtain bars consisting of a succession of N-shaped elements without modifying the inclination of the guide in the course of the operation. It would suffice, to this effect to modify, between one bending operation and the next one, the length of the branches, that is to say the distance the bar is moved forward. In this case, however, the spire, as it is being formed would extend away from the axis, with an angle equal to $d$, as shown in Fig. 10. On the contrary, with the method as just above described, the spires are caused to wind about shaft 2 or the prolonged part thereof. Now this is important because the bending at $a$ produces, in the spires that are already made, torsional reactions which tend to bring this bend $b$ away from said axis and, in order to obtain spires the branches of which are positioned in parallel planes as diagrammatically shown in Fig. 6, it is, on the contrary, necessary, when a bend is formed, (for instance the bend shown at $b$ in Fig. 12) that the preceding bend $b$ should remain in contact with axis 4. Owing to the process above described, the preceding spires such as $b$ turn about the axis 4 and are applied by their side against said rod 4, thus preventing them from being moved away.

When it is desired to obtain V-shaped spires, as shown in Fig. 11, the operation will be similar the interval between the stops being so chosen that $OB_1$ is equal to $$\frac{e^1}{2},$$

$OB_2$ is equal to $$\frac{e^2}{2},$$

and so on. In this case, the inclination of the guide will be modified only for changing the pitch, that is to say for passing from stop $B^1$ to stop $B^2$ for instance, this change in the inclination of the guide with respect to the shaft taking place during the rotation of the knife.

It will be noted that this adjustment system is determined as a function of the height $h$ that the reenforcement is to be given and the interval between reenforcing elements such as is indicated on the building plan. Therefore the operator has no calculation to make.

The mechanical structure of the shaft and of its control and the arrangement of the means for adjusting the guide might be modified.

It will be readily understood that it would be possible to provide an automatic feed of the bar to be bent. On the other hand it is obvious that the machine makes it possible to obtain helical reenforcing elements of any desired shape, for instance of polygonal cross section, with spires that are not uniformly inclined with respect to one another, and so on.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A machine for the manufacture of helical-shaped elements of reenforcements for reenforced concrete structures, which comprises, in combination, a rigid frame, a shaft journalled in said frame, a rod rigid with said shaft and in coaxial line therewith, a knife parallel with said shaft carried by it in eccentric position with respect thereto, and a guiding member pivotally mounted about an axis at right angles to said shaft.

2. A machine for the manufacture of helical-shaped elements of reenforcements for reenforced concrete structures, which comprises, in combination, a rigid frame, a shaft journalled in said frame, a rod rigid with said shaft and in coaxial line therewith, a knife parallel with said shaft carried by it in eccentric relation with respect thereto, a guiding member pivotally mounted about an axis at right angles to said shaft and an arm adapted to act as a stop for said guiding member adjustably mounted in parallel relation with said shaft.

3. A machine for the manufacture of helical-shaped elements of reenforcements for reenforced concrete structures, which comprises, in combination, a rigid frame, a shaft journalled in said frame, a rod rigid with said shaft and in coaxial line therewith, a knife parallel with said shaft carried by it in eccentric relation with respect thereto, a guiding member pivotally mounted about an axis at right angles to said shaft, an arm adjustably mounted in parallel relation to said shaft, and a plurality of stops adjustable on said arm adapted to cooperate with said guiding member so as to fix the angle of said member with said shaft.

4. A machine according to claim 3 in which said guiding member is provided with a longitudinal groove, said stops consisting of nuts carried in adjustable position along said arm and adapted to engage into said groove, whereby the guiding member can readily engage said stops and be readily disengaged from them.

5. A machine for the manufacture of helical-shaped elements of reenforcements for reenforced concrete structures, which comprises, in combination, a rigid frame, a shaft journalled in said frame, a rod rigid with said shaft and in coaxial line therewith, a knife parallel with said shaft and carried by it in eccentric relation with respect thereto, stops respectively carried by said frame and said shaft for limiting the rotation of said shaft in said frame, and a guiding member pivotally mounted in said frame about an axis at right angles to said shaft.

6. A machine according to claim 5 in which said stops are adjustable.

JEAN G. THIBIERGE.